(12) United States Patent
Rane et al.

(10) Patent No.: US 10,846,423 B2
(45) Date of Patent: *Nov. 24, 2020

(54) SYSTEM AND ARCHITECTURE FOR ANALYTICS ON ENCRYPTED DATABASES

(71) Applicant: Palo Alto Research Center Incorporated, Palo Alto, CA (US)

(72) Inventors: Shantanu Rane, Mountain View, CA (US); Vincent Bindschaedler, Urbana, IL (US); Alejandro E. Brito, Mountain View, CA (US); Ersin Uzun, Campell, CA (US); Vanishree Rao, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 57 days.

This patent is subject to a terminal disclaimer.

(21) Appl. No.: 15/674,935

(22) Filed: Aug. 11, 2017

(65) Prior Publication Data

US 2019/0050591 A1 Feb. 14, 2019

(51) Int. Cl.
*G06F 21/62* (2013.01)
*H04L 9/00* (2006.01)
*H04L 9/30* (2006.01)

(52) U.S. Cl.
CPC .......... *G06F 21/6227* (2013.01); *H04L 9/008* (2013.01); *H04L 9/30* (2013.01)

(58) Field of Classification Search
CPC ........ G06F 21/6227; H04L 9/008; H04L 9/30
See application file for complete search history.

(56) References Cited

U.S. PATENT DOCUMENTS

| | | | |
|---|---|---|---|
| 2013/0191650 A1* | 7/2013 | Balakrishnan | G06F 21/6227 713/190 |
| 2016/0306995 A1* | 10/2016 | Arasu | G06F 21/6218 |
| 2017/0308580 A1* | 10/2017 | Naganuma | G06F 17/30513 |
| 2017/0344646 A1* | 11/2017 | Antonopoulos | G06F 17/30867 |
| 2019/0005248 A1* | 1/2019 | Krishnamurthy | G06F 16/951 |

OTHER PUBLICATIONS

Dan Boneh, Eu-Jin Gih and Kobbi Nissim, Evaluating 2-DNF Formulas on Ciphertexts, Apr. 2006, pp. 1-13 (Year: 2006).*

* cited by examiner

*Primary Examiner* — Harunur Rashid
(74) *Attorney, Agent, or Firm* — Fay Sharpe LLP

(57) ABSTRACT

A method is provided for generating an encrypted database. The method includes: receiving a plaintext database having plaintext data entries therein; and generating an encrypted database using the plaintext database, the encrypted database including encrypted data entries therein. The encrypted database is configured to support at least one form of conditional query such that the at least one form of conditional query returns a correct encrypted result when the query is computed on the encrypted data entries without the decryption thereof.

17 Claims, 2 Drawing Sheets

SYSTEM AND ARCHITECTURE FOR ANALYTICS ON ENCRYPTED DATABASES

BACKGROUND

The subject matter of the present specification generally relates to the art of data security. Exemplary embodiments disclosed herein find particular application in conjunction with a Structured Query Language (SQL) database (DB) and/or a Database Management System (DBMS) (e.g., such as MySQL), and they will be described herein with particular reference thereto at times. However, it is to be appreciated that various exemplary embodiments such as those disclosed herein are also amenable to other like applications including other types of relational databases as well as graphic and/or other types of databases.

In the field of data security, certain types of encrypted databases are not unknown. However, heretofore, there has been no strong consensus about a suitable architecture that incorporates sufficient privacy by design in data analytics. For example, there has been no strong consensus about how encrypted data should be arranged or stored such that it remains amenable to otherwise traditional database queries, how key management is to be performed and/or what measures should be taken to perform private analytics efficiently.

One proposed architecture is known as "CryptDB." In general, it involves storing data in an encrypted format using "onions of encryption," in which different encryptions are successively applied to the data. Accordingly, depending upon a query, layers of encryption can be removed (like peeling an onion), until one can access the data in the appropriate encrypted format, and perform sufficient computations thereon to answer the query. While this approach has been shown to support a subset of SQL queries, making it useful to data scientists who are already skilled in analytics for plaintext databases, there are some potential disadvantages.

One potential disadvantage to the foregoing approach is that not all the cryptosystems employed in CryptDB have sufficiently strong security properties. For instance, deterministic encryption and order preserving encryption may leak more information than is sufficient to answer a given query. In particular, in order to execute SQL WHERE queries, CryptDB has to access the deterministic encryption layer, which may leak additional information to someone that knows the distribution and cardinality of the data.

Disclosed herein are a new and/or improved system and/or method for providing and/or utilizing an encrypted database.

INCORPORATION BY REFERENCE

The present specification incorporates by reference the U.S. patent application entitled "System and Architecture for Supporting Analytics on Encrypted Databases," filed on or about even date herewith, by inventors Shantanu Rane, et al.

BRIEF DESCRIPTION

This Brief Description is provided to introduce concepts related to the present specification. It is not intended to identify essential features of the claimed subject matter nor is it intended for use in determining or limiting the scope of the claimed subject matter. The exemplary embodiments described below are not intended to be exhaustive or to limit the claims to the precise forms disclosed in the following Detailed Description. Rather, the embodiments are chosen and described so that others skilled in the art may appreciate and understand the principles and practices of the subject matter presented herein.

In accordance with one exemplary embodiment, there is provided a method for generating an encrypted database. The method includes: receiving a plaintext database having plaintext data entries therein; and generating an encrypted database using the plaintext database, the encrypted database including encrypted data entries therein. The encrypted database is configured to support at least one form of conditional query such that the at least one form of conditional query returns a correct encrypted result when the query is computed on the encrypted data entries without the decryption thereof.

In accordance with another exemplary embodiment, there is provided a system for administering an encrypted database. The system includes: an Extract, Transfer and Load (ETL), implemented on one or more computers, wherein said ETL server is operative to (i) receive as input a plaintext database having unencrypted data therein, and (ii) based upon the input plaintext database, output a corresponding encrypted database having encrypted data therein; a database (DB), implemented on one or more computers, wherein said DB server is operative to (i) receive and maintain the encrypted database from the ETL server, and (ii) return encrypted data in response to queries submitted to the DB server; and a computation, implemented on one or more computers, wherein said computation server is operative to (i) submit queries to the DB server, and (ii) conduct computations on encrypted data returned from the DB server. Suitably, the computations are conducted on the encrypted data from the encrypted database without decryption of the encrypted data, and results obtained from said computations are encrypted. The encrypted database is configured so as to support obtaining correct encrypted results in response to at least one form of conditional query without revealing samples of the unencrypted data underlying the encrypted data.

Numerous advantages and benefits of the subject matter disclosed herein will become apparent to those of ordinary skill in the art upon reading and understanding the present specification. It is to be understood, however, that the detailed description of the various embodiments and specific examples, while indicating preferred and/or other embodiments, are given by way of illustration and not limitation.

BRIEF DESCRIPTION OF THE DRAWINGS

The following Detailed Description makes reference to the figures in the accompanying drawings. However, the inventive subject matter disclosed herein may take form in various components and arrangements of components, and in various steps and arrangements of steps. The drawings are only for purposes of illustrating exemplary and/or preferred embodiments and are not to be construed as limiting. Further, it is to be appreciated that the drawings may not be to scale.

DETAILED DESCRIPTION

Figure 1:
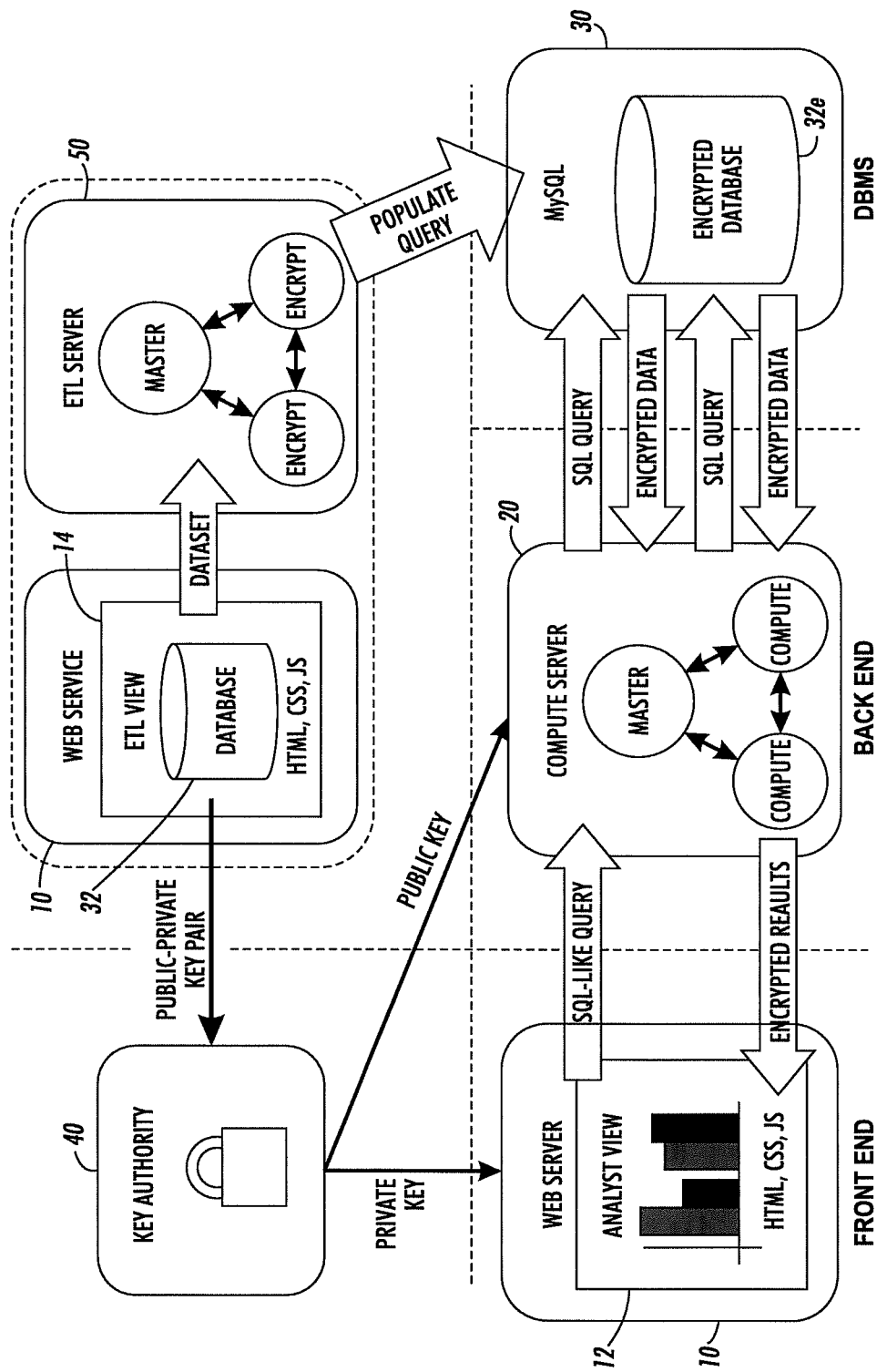
FIG. 1 is a diagrammatic illustration showing an exemplary system and/or architecture in accordance with aspects of the present inventive subject matter.

For clarity and simplicity, the present specification shall refer to structural and/or functional elements, relevant standards, algorithms and/or protocols, and other components, methods and/or processes that are commonly known in the art without further detailed explanation as to their configuration or operation except to the extent they have been modified or altered in accordance with and/or to accommodate the preferred and/or other embodiment(s) presented herein. Moreover, the apparatuses and methods disclosed in the present specification are described in detail by way of examples and with reference to the figures. Unless otherwise specified, like numbers in the figures indicate references to the same, similar or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific materials, techniques, arrangements, etc. are either related to a specific example presented or are merely a general description of such a material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to the figures.

In accordance with aspects of the present inventive subject matter, the set of computations that can be performed on DBs secured with additively homomorphic cryptosystems is extended. One exemplary embodiment is concerned with relational DBs that can be queried using a language like SQL. Consider, for example, the following SQL query that adds up the number of children in a DB of a school:

SELECT AVG(age) FROM hogwarts

If the number of children in each household is encrypted using a semantically secure additively homomorphic cryptosystem, then this query can be processed in the encrypted domain, returning an encrypted result. This result can then be decrypted by an analyst or other user with the appropriate privileges.

Consider now, a slightly more complicated query:

SELECT AVG(age) FROM hogwarts
WHERE gender="female";

In this query, the encrypted-domain summation is performed only over those particular rows in the table that satisfy the specified condition, i.e., the gender attribute is "female". Even with this small addition, executing the query is no longer straightforward. The reason is that, with semantically secure encryption, it is not readily feasible to tell which rows correspond to female children, just by examining the ciphertexts in the encrypted "gender" column of the table.

One could instead use deterministic encryption for the gender column. However, this will result in only two kinds of ciphertexts, one for male and one for female. This makes it easy to identify the rows corresponding to female and male children while still keeping the age of each student encrypted using the semantically secure additively homomorphic cryptosystem. A problem with the foregoing deterministic encryption approach is that it can leak information, not only to the DB server, but also to any computing node that is processing the query in the encrypted domain. In practice, the storage and computation could be based in the cloud or otherwise, and thus may be handled by an untrusted party. For example, a Chosen Plaintext Attack (CPA) on such a DB plainly reveals which entries in the database correspond to girls and which correspond to boys. In accordance with aspects of the present inventive subject matter, a system and/or method is proposed to avoid such privacy leakage. More specifically, a system and/or method is described which is capable of processing conditional queries like the above, with semantic security.

The present specification describes an architecture for performing analytics on privacy-sensitive data. Suitably, the architecture includes a DB server, e.g., an untrusted DB server. In practice, the DB server stores encrypted data and is backed by a relational database management system such as MySQL or the like. The architecture also includes a computation server (e.g., an untrusted computation server) that performs computations in the encrypted domain, and a web server or web service that queries the DB. Suitably, the computation server returns an encrypted result for every query submitted by the web server/service. In practice, only an authorized user is able to decrypt the returned results. In an exemplary embodiment, aggregate functions (e.g., including summations, linear combinations, basic classifiers, count queries and histograms) are computed without discovering the samples of the underlying data. Suitably, objectives of the present inventive subject matter (e.g., supporting a subset of SQL queries, while providing improved privacy assurances) are achieved using semantically secure homomorphic encryption techniques within the described system and/or architecture.

Generally, the system and/or architecture described herein enables privacy-preserving data analytics, whereby a dataset owner or curator grants to a user (e.g., such as an analyst or data scientist) the ability to run queries against an encrypted version of the dataset. More precisely, the disclosed system and/or architecture suitably provides the following functionality to the dataset owner and analyst:

the dataset owner is provided the ability to generate cryptographic keys, pre-process and encrypt a dataset; and the analyst is provided the ability to run queries against a dataset in its encrypted form, and obtain the necessary key(s) from the data owner to decrypt the query results.

Suitably, to provide the aforementioned functionality, the system is designed, for example, with a three-tiered architecture as illustrated in FIG. 1. More specifically, in practice, the system may include: (i) a so-called "Front-End," e.g., implement via a web service and/or web server 10 or the like; (ii) a so-called "Back End" including a Computation Server (CS) 20; and (iii) a DBMS 30, e.g., including a DB server implemented via MySQL or another relational or other suitable type of DB.

In practice, a basic embodiment includes the following elements: (1) a DB server that stores data in one or more of a plurality of encrypted formats (e.g., the DB server is a MySQL DB server or the like); (2) a CS that executes queries provided by a user/analyst using encrypted data served by the DB (e.g., via an appropriate privacy preserving protocol); and (3) a web service/server that supports queries made to the DB and receives encrypted results corresponding to the queries made.

In an expanded embodiment, a Key Authority (KA) 40 is included that provides key management functionality. In particular, the KA 40 provides public encryption keys to generate the encrypted DB that is stored in the DB server. Further, the KA 40 provides public encryption keys to the CS 20 for running privacy-preserving protocols. Finally, the KA 40 provides decryption keys to an authorized user of the web service/server that allows the user to decrypt the encrypted result of the query that is received from the CS 20.

In a further expanded embodiment, an additional element and/or elements are provided to prepare the encrypted DB (denoted as $D_e$ herein). In practice, preparation of $D_e$ starts with an unencrypted DB (denoted as $D_p$ herein) as input. That is to say, the data elements in $D_p$ are initially stored and/or maintained in an unencrypted form or as plaintext. Prior to encryption, the schema of $D_p$ is augmented in such a way that the augmented schema supports a desired subset of SQL queries. In the augmented DB (denoted herein as $D_a$), the data elements are also stored/maintained in an unencrypted form or as plaintext. $D_a$ (having the augmented schema with the resulting data) is then encrypted using one or more encryption formats to achieve $D_e$. Finally, $D_e$ is transmitted to the DB server.

Suitably, the Front-End provides a specific view and/or user interface (UI) for a specific task or tasks. In practice, for example, an Analyst View 12 and/or suitable UI is provided in a first instance to be used by an analyst to write and run Structured Query Language (SQL) and/or SQL-like queries against an encrypted dataset 32e, whereas in a second instance an Extract, Transfer and Load (ETL) View 14 and/or suitable UI is provided to be used by a data owner to pre-process and encrypt a plaintext dataset 32. In practice, the Front-End may interact directly with the CS 20, for the Analyst View 12, and with an ETL server 50 for the ETL View 14. In a suitable embodiment, the ETL server 50 may be a trusted "helper" under the control of the data owner. In contrast, the CS 20 may be an untrusted helper that functions as a separate entity. Suitably, the CS 20 is responsible for processing the analyst's queries it receives, and interacting with the DBMS 30. Because the dataset 32e is encrypted in the DBMS 30, the CS 20 performs the query on encrypted data and returns (encrypted) results to the analyst through the Front-End. The analyst, having previously obtained the necessary decryption keys, e.g., from the Key Authority (KA) 40, can recover the queries' results by decrypting the data received by the Front-End from the CS 20.

In one exemplary embodiment, the DBMS 30 is implemented with a standard MySQL DB server, while both the CS 20 and ETL server 50 are implemented with Java-based programs (e.g., which use the same codebase). Suitably, the Front-End may be implemented as a combination of Javascript, HyperText MarkUp Language (HTML) and Cascading Style Sheets (CSS). That said, in practice, other implementations for the aforementioned components may be employed which are suitable for achieving the functions, objectives, operations and/or purposes described herein.

In accordance with exemplary embodiments described herein, one threat sought to be avoided is parties other than the data owner and analyst learning information about the dataset 32 imported into the system. This includes both accidental and intentional leaks at the CS 20 and DBMS 30, both of which may be untrusted. Suitably, such leaks are prevented by design because the imported dataset 32 is encrypted under keys which neither the DBMS 30 nor the CS 20 have access to. Additionally, and depending on the context, the system's architecture may provide protection against additional threats, e.g., such as the following:

(1) The analyst learning sensitive information about individuals whose records are in the imported dataset 32; and/or
(2) The CS 20, DBMS 30 and/or data owner learning about the analyst's queries.

For example, guarding against item (1) above is referred to as preserving an individual's privacy, and may be accomplished using techniques such as Differential Privacy and, guarding against item (2) above is referred to as preserving query privacy, and may be accomplished using "special" queries which obfuscate the "real" query.

Figure 2:
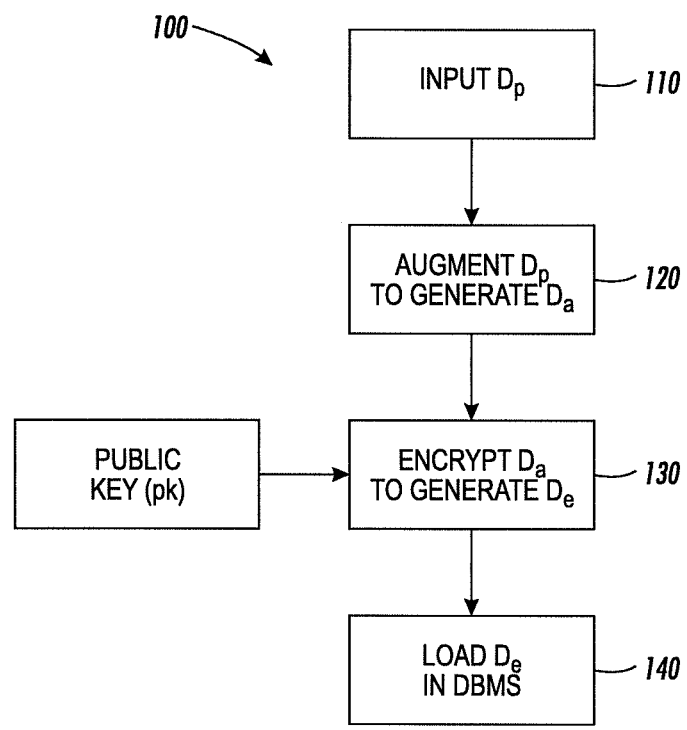
FIG. 2 is a flow chart showing an exemplary process and/or method for pre-processing and encrypting a database in accordance with aspects of the present inventive subject matter.

With additional reference now to FIG. 2, there is shown a process and/or method 100 by which a plaintext DB $D_p$ is pre-processed and encrypted, e.g., via the ETL server 50. In practice, a DB owner or the like may employ the Front-End web service/server 10, e.g., using the ETL View 14 or other suitable UI to access the ETL server 50 in order to pre-process and encrypt the plaintext dataset 32.

Suitably, the process or method 100 converts an input plaintext DB $D_p$ to an encrypted DB $D_e$, that supports conditional queries in the encrypted domain. Of course, one could construct $D_e$ simply by encrypting each individual entry of $D_p$ using an appropriate semantically secure homomorphic cryptosystem, but as explained above, this approach would not effectively support conditional queries as desired. Instead, as described herein, $D_a$ is first constructed, which is an augmented plaintext version of $D_p$, and then $D_a$ is encrypt to obtain $D_e$.

As shown, in step 110, $D_p$ (containing the plaintext dataset 32) is input into the ETL server 50, e.g., using an ETL process. The data elements of $D_p$ are suitably unencrypted and/or represented in a plaintext form. Suitably, along with $D_p$ there is input a specification identifying those attributes which will be made available for use in connection with conditional queries and the like. For example, in the above-referenced scenario, the gender attribute may be such a specified conditional attribute that takes two distinct values, i.e., male or female. A conditional attribute is an attribute of the DB (e.g., which is specified and/or identified along with the input $D_p$) that will be made available for the execution of conditional queries and/or the like computed in the encrypted domain.

In step 120, the schema of the input $D_p$ is augmented to achieve $D_a$, e.g., such that the augmented schema supports a desired set of queries after the DB is encrypted.

More specifically, the augmentation and/or generation of $D_a$ may take place as follows. The resulting augmented plaintext DB $D_a$ will contain a number of extra columns as compared to the input $D_p$. The number of extra columns is $\bar{v} = \Pi_{m=1}^{M} v_m$, where there are M specified conditional attributes, and each of those attributes take $v_m$ possible values, m=1, 2, . . . , M. In practice, some attributes may take only one value for a given DB entry. For instance, the aforementioned gender attribute may take a value of male or female. Other attributes can take more than one value for a given database entry. For instance, a hobbies attribute for a given student may take multiple values such as reading, cycling, herbology, etc.

In one suitable embodiment, to construct $D_a$ from $D_p$, the following sub-steps are applied to each of the M conditional attributes. In the following sub-steps consider a conditional attribute $A_m$, m=1, 2, . . . , M that takes $v_m$ distinct values. Then, for each attribute $A_m$:

1) Set $D_a = D_p$.
2) Create $v_m$ extra columns in $D_a$. For convenience, consider the additional $v_m \times n$ entries added to the database $D_a$ as a result of the $v_m$ extra columns as belonging to a matrix S. This notation will allow us to refer to the additional element in the $i^{th}$ row and $j^{th}$ column as $S(i, j)$ where $1 \le i \le n$, and $1 \le j \le v_m$.
3) For every row index i, set $S(i, j)$ to be the binary indicator variable for the $j^{th}$ possible value of $A_m$. Thus, for a given row $i \in \{1, 2, \ldots, n\}$, if the attribute value is $b \in \{1, 2, \ldots, v_m\}$, then $S(i, b) = 1$ and $S(i, j) = 0$ for all $j \ne b$.

Having suitably obtained the augmented plaintext DB $D_a$, at step 130, $D_a$ is encrypted to obtain $D_e$, suitably using a public key (pk), e.g., obtained from the KA 40. In practice, this encryption is suitably achieved by employing a combination of additive secret sharing and a semantically secure homomorphic cryptosystem. The following describes two suitable embodiments which may be employed depending upon the kind of homomorphic cryptosystem used to construct $D_e$, although other variations may likewise be suitable and/or desired depending on the particular environment, computing, storage and/or other applicable considerations.

In a first variation or embodiment, the encryption procedure uses a cryptosystem that supports 2-DNF (Disjunctive Normal Form) operations, e.g., the BGN (Boneh, Goh, and Nissim) cryptosystem, which supports the encrypted-domain computations that involve a single multiplication followed by an unlimited number of additions. With the BGN cryptosystem, the database $D_a$ (e.g., as obtained above) is encrypted, with the addition of a single encrypted column per queried attribute. The use of the BGN variant is particularly applicable when the computational power available for decrypting the encrypted result is relatively high, but the storage available at the DB server is relatively low.

In a second variant or embodiment, the encryption procedure uses an additively homomorphic cryptosystem, e.g., the Paillier cryptosystem, which supports only encrypted-domain additions. The two variants address a tradeoff between the capability of the cryptosystem and the storage overhead for $D_e$. With the Paillier cryptosystem, the database $D_a$ (e.g., as obtained above) is encrypted, with the addition of a single encrypted column per (queried attribute, conditional attribute) pair. The use of the Paillier variant is particularly applicable when the computational power available for decrypting the encrypted result is relatively low, but the storage available at the DB server can be relatively high.

Referring now to the aforementioned first variant, the input to the encryption process or step 130 includes: (1) the augmented plaintext database $D_a$, which contains $\bar{v}=\Pi_{j=i}^{m} v_i$ extra columns; and (2) the public key pk of a 2-DNF homomorphic cryptosystem. The resulting output is the encrypted database $D_e$, in which the entries in the $\bar{v}$ extra columns are encrypted using a 2-DNF homomorphic cryptosystem and attributes to be queried are additively blinded.

To describe the encryption protocol (including application of the below sub-steps), we focus here separately on the conditional attributes, i.e., the attributes following the WHERE clause and the query attributes, i.e., the attributes following the SELECT statement.

1) As above, let the conditional attribute be $A_m$, m=1, 2, . . . , M that takes $v_m$ distinct values. Index these values using the variable j=1, 2, . . . , $v_m$. Then, for each attribute $A_m$, there is constructed binary indicator variables S(i, j) for the $j^{th}$ possible value of $A_m$ in the $i^{th}$ row, where i∈{1, 2, . . . , n}. S(i, j) is then encrypted using a semantically secure 2-DNF homomorphic cryptosystem, to obtain E (pk, S(i, j)).

2) Let the queried attributes be $Q_k$, k=1, 2, . . . , L. Then, instead of each plaintext value $Q_k(i)$ of attribute $Q_k$ in row i∈{1, 2, . . . , n}, store E (pk, $Q_k(i)$), which is the 2-DNF homomorphic encryption of the query attribute value under the public key pk of the data owner.

As a result of applying the above steps to the value of each of the M conditional attributes and L queried attributes in $D_a$, the encrypted database $D_e$ is obtained.

Referring now to the aforementioned second variant, the input to the encryption process or step 130 includes: (1) the augmented plaintext database $D_a$, which contains $\bar{v}=\Pi_{j=i}^{m} v_i$ extra columns; and (2) the public key pk of an additively homomorphic cryptosystem. The resulting output is the encrypted database $D_e$, in which the entries in the $\bar{v}$ extra columns are encrypted using an additively homomorphic cryptosystem and attributes to be queried are additively blinded.

To describe the encryption protocol (including application of the below sub-steps), we again focus here separately on the conditional attributes, i.e., the attributes following the WHERE clause and the query attributes, i.e., the attributes following the SELECT statement.

1) As above, let the conditional attribute be $A_m$, m=1, 2, . . . , M that takes $v_m$ distinct values. As above, index these values using the variable j=1, 2, . . . , $v_m$. Then, for each attribute $A_m$, there is constructed binary indicator variables S(i, j) for the $j^{th}$ possible value of $A_m$ in the $i^{th}$ row, where i∈{1, 2, . . . , n}. S(i, j) is then encrypted using a semantically secure additively homomorphic cryptosystem, to obtain E (pk, S(i, j)).

2) Let the queried attributes be $Q_k$, k=1, 2, . . . , L. Then for the value $Q_k(i)$ of attribute $Q_k$ in row i∈{1, 2, . . . , n}, choose an integer $r_k(i)$ uniformly at random from the interval ∈[−$R_k$, $R_k$], where $R_k$ is a positive integer, and the number of bits in $R_k$, denoted by $\lambda(R_k)$ is a security parameter. In place of the plaintext attribute value $Q_k(i)$, store the additively blinded value $\tilde{Q}_k(i)=Q_k(i)+r_k(i)$. Let the column containing these blinded values be considered as a new attribute $\tilde{Q}_k$.

3) For each queried attribute $Q_k$, and each of the $v_m$ possible values of the conditional attribute $A_m$, an extra column is introduced denoted by $R_{k,m}$. The entry in the $i^{th}$ row of this new column is given by $R_{k,j}(i)=E$ (pk, $r_k(i) \cdot S(i, j)$) for j=1, 2, . . . , $v_m$.

As a result of applying the above steps to the value of each of the M conditional and L queried attributes in $D_a$, we obtain the encrypted database $D_e$. Unlike the 2-DNF homomorphic case considered above, the total number of columns added as a result of sub-step 3 above is $L=\Sigma_{m=1}^{M} v_m$, which makes this approach less storage-efficient.

In either case, having thus obtained the encrypted DB $D_e$, at step 140, the encrypted DB $D_e$ is transmitted, loaded and/or otherwise sent to the DBMS 30. In practice, in the DBMS 30, all the table names are available in plaintext, and all the column attribute names are available in plaintext, but the entries in the tables are encrypted as explained above. That is to say, the only items available in plaintext at the DB server are the attribute names. For example, in a relational DB, the names of the tables and columns are known, but the data entries in those columns are encrypted.

Having thus loaded the encrypted DB $D_e$ into the DBMS 30, the same may be accessed by the CS 20 in response to queries submitted by a user/analyst via the Front-End web service/server 10, e.g., using the Analyst View 12. Suitably, the queries may be submitted in a plaintext form. The DB server of the DBMS 30 in turn provides data to the CS 20 and the computations executed by the CS 20 are suitably carried out in the encrypted-domain. In response to the submitted query, the results of the computations carried out by the CS 20 are returned in an encrypted form. Using a corresponding decryption key or private key (corresponding to the public key used to carry out the encryption), e.g., made available or otherwise obtained from the KA 40, the analyst may decrypt the encrypted results that are received and view them in plaintext. In practice, such a decryption/private key is not made available to and/or otherwise kept from the CS 20 or DBMS 30 to limit the potential for information or data leakage threat.

The above methods, system, platforms, modules, processes, algorithms and/or apparatus have been described with respect to particular embodiments. It is to be appreciated, however, that certain modifications and/or alteration are also contemplated.

It is to be appreciated that in connection with the particular exemplary embodiment(s) presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that any one or more of the particular tasks, steps, processes, methods, functions, elements and/or components described herein may suitably be implemented via hardware, software, firmware or a combination thereof. In particular, various modules, components and/or elements may be embodied by processors, electrical circuits, computers and/or other electronic data processing devices that are configured and/or otherwise provisioned to perform one or more of the tasks, steps, processes, methods and/or functions described herein. For example, a processor, computer or other electronic data processing device embodying a particular element may be provided, supplied and/or programmed with a suitable listing of code (e.g., such as source code, interpretive code, object code, directly executable code, and so forth) or other like instructions or software or firmware, such that when run and/or executed by the computer or other electronic data processing device one or more of the tasks, steps, processes, methods and/or functions described herein are completed or otherwise performed. Suitably, the listing of code or other like instructions or software or firmware is implemented as and/or recorded, stored, contained or included in and/or on a non-transitory computer and/or machine readable storage medium or media so as to be providable to and/or executable by the computer or other electronic data processing device. For example, suitable storage mediums and/or media can include but are not limited to: floppy disks, flexible disks, hard disks, magnetic tape, or any other magnetic storage medium or media, CD-ROM, DVD, optical disks, or any other optical medium or media, a RAM, a ROM, a PROM, an EPROM, a FLASH-EPROM, or other memory or chip or cartridge, or any other tangible medium or media from which a computer or machine or electronic data processing device can read and use. In essence, as used herein, non-transitory computer-readable and/or machine-readable mediums and/or media comprise all computer-readable and/or machine-readable mediums and/or media except for a transitory, propagating signal.

Optionally, any one or more of the particular tasks, steps, processes, methods, functions, elements and/or components described herein may be implemented on and/or embodiment in one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the respective tasks, steps, processes, methods and/or functions described herein can be used.

Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the inventive subject matter be construed as including all such modifications and alterations insofar as they come within the scope of the appended claims or the equivalents thereof.

What is claimed is:

1. A method of generating an encrypted database, said method comprising:
   receiving a plaintext database having plaintext data entries therein;
   augmenting the received plaintext database to achieve an augmented plaintext database by appending one or more supplemental arrays of data entries in plaintext format to the received plaintext data base, wherein said supplemental arrays are generated from data in the received plaintext database so as to represent one or more attributes in the received plaintext database which are identified as conditional attributes that are to be made available for an execution of a conditional query in an encrypted domain; and
   generating an encrypted database using the augmented plaintext database, said encrypted database including encrypted data entries therein;
   wherein said encrypted database is configured to support at least one form of conditional query such that said at least one form of conditional query returns a correct encrypted result when said query is computed on the encrypted data entries without the decryption thereof.

2. The method of claim 1, wherein the encrypted data is encrypted with a semantically secure encryption.

3. The method of claim 2, wherein the encrypted data is encrypted using a homomorphic cryptosystem.

4. The method of claim 3, wherein the homomorphic cryptosystem is an additively homomorphic cryptosystem.

5. The method of claim 3, wherein the homomorphic cryptosystem supports 2-DNF (Disjunctive Normal Form) operations.

6. The method of claim 1, wherein the at least one form of conditional query is one of a WHERE query or a GROUPBY query.

7. The method of claim 1, further comprising:
   establishing a public-private key pair, wherein a public key of said pair is used to encrypt the encrypted database and a private key of said pair is provided to decrypt a returned result of a query.

8. The method of claim 1, wherein said private key is not made available to a database management system in which the encrypted database is maintained or a server which computes queries conducted on the encrypted database.

9. A system for administering an encrypted database, said system comprising:
- an Extract, Transfer and Load (ETL) server, implemented on one or more hardware components, wherein said ETL server is operative to (i) receive as input a plaintext database having unencrypted data therein, and (ii) based upon the input plaintext database, output a corresponding encrypted database having encrypted data therein, wherein the ETL server augments the input plaintext database to achieve an augmented plaintext database by appending one or more supplemental arrays of data entries in unencrypted format to the input plaintext data base, said supplemental arrays being generated from data in the input plaintext database so as to represent one or more attributes in the input plaintext database which are identified as conditional attributes that are to be made available for an execution of a conditional query in an encrypted domain, and wherein the ETL server generates the corresponding encrypted database by encrypting the augmented plaintext database;
- a database (DB) server, implemented on one or more hardware components, wherein said DB server is operative to (i) receive and maintain the encrypted database from the ETL server, and (ii) return encrypted data in response to queries submitted to the DB server; and
- a computation server, implemented on one or more hardware components, wherein said computation server is operative to (i) submit queries to the DB server, and (ii) conduct computations on encrypted data returned from the DB server;
- wherein said computations are conducted on the encrypted data from the encrypted database without decryption of the encrypted data, and results obtained from said computations are encrypted, said encrypted database being configured so as to support obtaining correct encrypted results in response to at least one form of conditional query without revealing samples of the unencrypted data underlying the encrypted data.

10. The system of claim 9, wherein the encrypted data is encrypted with a semantically secure encryption.

11. The system of claim 10, wherein the encrypted data is encrypted using a homomorphic cryptosystem.

12. The system of claim 11, wherein the homomorphic cryptosystem is an additively homomorphic cryptosystem.

13. The system of claim 11, wherein the homomorphic cryptosystem supports 2-DNF (Disjunctive Normal Form) operations.

14. The system of claim 9, wherein the at least one form of conditional query is one of a WHERE query or a GROUPBY query.

15. The system of claim 9, further comprising:
- a key authority which administers a public-private key pair, wherein a public key of said pair is used to encrypt the encrypted database and a private key of said pair is usable to decrypt the encrypted result of a query.

16. The system of claim 15, wherein said private key is not made available to the DB server or the computation server.

17. A method of generating an encrypted database, said method comprising:
- receiving a plaintext database having plaintext data entries therein arranged in a first number of arrays;
- augmenting the received plaintext database to achieve an augmented plaintext database by appending one or more supplemental arrays of data entries in plaintext format to the received plaintext data base such that the augmented plaintext database has data entries arranged in a second number of arrays which second number is greater than the first number, wherein the data entries in said supplemental arrays are generated based upon existing data entries in the received plaintext database so as to represent one or more attributes in the received plaintext database which are identified as conditional attributes that are to be made available for an execution of a conditional query in an encrypted domain; and
- generating an encrypted database using the augmented plaintext database, said encrypted database including encrypted data entries therein;
- wherein said encrypted database is configured to support at least one form of conditional query such that said at least one form of conditional query returns a correct encrypted result when said query is computed on the encrypted data entries without the decryption thereof.

* * * * *